United States Patent [19]

Vatland et al.

[11] Patent Number: 5,577,172
[45] Date of Patent: Nov. 19, 1996

[54] HIGH-CAPACITY PROTOCOL FOR PACKET-BASED NETWORKS

[75] Inventors: Danny J. Vatland, Chanhassen; Jeff D. Pagel, Inver Grove Heights, both of Minn.

[73] Assignee: LaserMaster Corporation, Eden Prairie, Minn.

[21] Appl. No.: 299,010

[22] Filed: Aug. 31, 1994

Related U.S. Application Data

[63] Continuation-in-part of Ser. No. 270,046, Jul. 1, 1994.
[51] Int. Cl.⁶ .................................................. G06K 15/00
[52] U.S. Cl. .......................................... 395/114; 395/115
[58] Field of Search ..................... 395/114, 115, 395/117, 112, 164; 364/518

[56] References Cited

U.S. PATENT DOCUMENTS

| | | | |
|---|---|---|---|
| 4,439,760 | 5/1984 | Fleming | 340/799 |
| 4,712,214 | 12/1987 | Meltzer et al. | 371/32 |
| 4,829,468 | 5/1989 | Nonaka et al. | 364/900 |
| 4,887,228 | 12/1989 | Robert | 364/521 |
| 4,930,087 | 5/1990 | Egawa et al. | 364/518 |
| 5,018,138 | 5/1991 | Twitty et al. | 370/94.1 |
| 5,075,875 | 12/1991 | Love et al. | 395/117 |
| 5,084,877 | 1/1992 | Netravali et al. | 371/32 |
| 5,113,494 | 5/1992 | Menedez et al. | 395/163 |
| 5,119,473 | 6/1992 | Ikenoue | 395/115 |
| 5,122,973 | 6/1992 | Venner et al. | 395/117 |
| 5,150,454 | 9/1992 | Wood et al. | 395/114 |
| 5,163,055 | 11/1992 | Lee et al. | 371/32 |
| 5,163,122 | 11/1992 | Urabe et al. | 395/109 |
| 5,222,200 | 6/1993 | Callister et al. | 395/112 |
| 5,224,098 | 6/1993 | Bird et al. | 370/94.1 |
| 5,231,634 | 7/1993 | Giles et al. | 370/95.1 |
| 5,257,384 | 10/1993 | Farrand et al. | 395/725 |
| 5,260,933 | 11/1993 | Rouse | 370/14 |
| 5,287,354 | 2/1994 | Teel, Jr. et al. | 370/85.7 |
| 5,319,641 | 6/1994 | Fridrich et al. | 370/85.3 |
| 5,321,813 | 6/1994 | McMillen et al. | 395/200 |
| 5,328,278 | 7/1994 | Kokubo | 400/74 |
| 5,353,388 | 10/1994 | Motoyama | 395/117 |
| 5,375,204 | 12/1994 | Motoyama et al. | 395/164 |

FOREIGN PATENT DOCUMENTS 90310867.8 11/1990 European Pat. Off. .
92120100.0 11/1992 European Pat. Off. .

OTHER PUBLICATIONS

Felici, "RIPs Getting Soft in Their Old Age" *Publish*, Mar. 1994, pp. 44, 46 and 49.
Hurwicz, "Laser Printers: Breaking the 600–DPI Barrier", *Publish*, Mar. 1994, pp. 52 and 54.
Hayes, "The Printers Talk Back", *BYTE*, Dec. 1993, pp. 103, 104, 106, 108 and 110.
Wayner, "Print Pages Faster", *BYTE*, Dec. 1993, pp. 115, 116, 118, 120, 121, 122 and 123.
Inside AppleTalk, Second Edition, pp. I–22 thru I–23, and 10–1 thru 12–39.
Computer Technology Review, "Print Rasterization Moves Hostward With Support From SCSI", by Tom Bertram and Dan Miller, dated May 12, 1992, No. 6, Los Angeles, CA, US.

*Primary Examiner*—Raymond J. Bayerl
*Assistant Examiner*—Steven P. Sax
*Attorney, Agent, or Firm*—Kinney & Lange, P.A.

[57] ABSTRACT

A network protocol facilitates high speed transmission of raster data from a server to a client. The protocol defines a first sub-protocol for negotiating a connection and preparing to transmit a print job, and a second sub-protocol for transmitting a large quantity of raster data. The second sub-protocol allows the recipient of the data to dictate the order in which various types of data are transmitted, while allowing for efficient error correction of lost and/or corrupted packets. In one embodiment, a server is configured to transmit data to a client using the protocol of the present invention. In another embodiment, a client is configured to receive data from the server according to the protocol of the present invention. The protocol minimizes handshaking by sending a large number of data packets between acknowledgements.

19 Claims, 12 Drawing Sheets

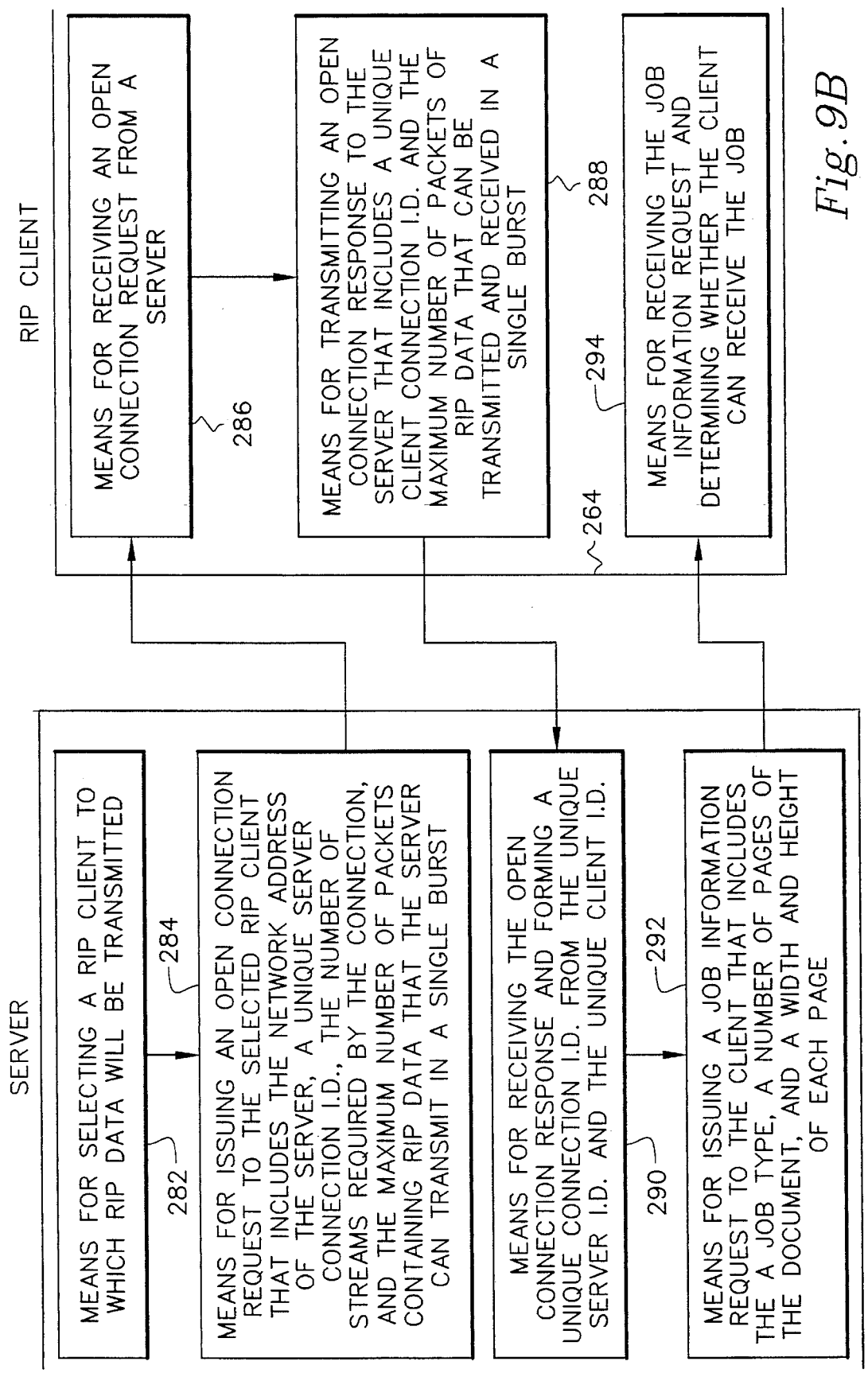

HIGH-CAPACITY PROTOCOL FOR PACKET-BASED NETWORKS

CROSS REFERENCE TO RELATED APPLICATION

This application is a Continuation-in-Part of application Ser. No. 08/270,046, filed Jul. 1, 1994 and entitled "METHOD AND APPARATUS FOR PRINTING A DOCUMENT OVER A NETWORK."

BACKGROUND OF THE INVENTION

The present invention is a protocol for transmitting information over a network. More specifically, the present invention is a protocol optimized for rapidly transmitting large amounts of data (such as raster image data generated by a host computer) via a packet-based network.

Typically, a document is printed over a network by preparing a series of page description language (PDL) instructions at a host computer and transferring those instructions to a printer over a network. The printer includes a raster image processor (RIP) that processes the series of PDL instructions into a raster image that is stored in a frame buffer, and the printer's print engine prints the raster image from the frame buffer.

Processing the series of PDL instructions into a raster image is known in the art as P/Ping, which is a computation intensive and memory intensive process that requires a significant amount of time relative to the amount of time it takes for the print engine to print the image. Therefore, prior art printers that process PDL instructions into raster images generally spend significant amounts of time RIPing the PDL image. During much of this time, the print engine must remain idle waiting for the raster image.

In U.S. Patent No. 5,113,494 to Menendez et al., a high speed raster image processor is disclosed that RIPs PDL instructions fast enough to minimize the idle time of a laser printer's print engine. The RIP disclosed by Menendez et al. resides in a common printer node with the print engine, and specifies a dedicated connection between the RIP and the prim engine. This approach dedicates a significant amount of hardware to perform the RIP function, and increases the cost of the printer.

Another prior approach is to provide the host computer with a RIP, which is typically implemented by software on the host computer. While this approach does not generally affect the time required to RIP a document, multiple hosts can RIP documents in parallel, with each host submitting a raster image of a document to a printer's print engine when RIPing is complete. The drawback to this approach, however, is that a tremendous amount of data must be sent over the network. While an 8½×11 inch page of color text represented by a sequence of PDL instructions and printed at a resolution of 300 dots per inch (dpi) will generally not require more than twenty kilobytes of data to be transferred over a network, a raster image of this same page of color text will require about four megabytes of data to be transferred over a network. In addition, for large printers, such as a 36 inch wide color printer, the amount of data to be transferred makes this approach prohibitive. A 300 dpi color image at a size of 54×54 inches requires about 125 megabytes of data to be transferred over the network. Since RIPless printers do not contain data storage resources of this magnitude, the raster image must be retransmitted over the network for each printed copy. In addition, on a typical Ethernet network adhering to the IEEE 802.3 specification (as well as other packet-based networks), prior communication protocols cannot transfer data to the printer fast enough to feed a moderately fast print engine.

The IEEE 802.3 specification defines a maximum packet size of approximately 1500 bytes. However, most prior protocols define a packet size that does not take advantage of the maximum packet size allowed by the network hardware, which reduces the bandwidth of the protocol. In addition, the overhead associated with processing and acknowledging every packet further limits the bandwidth of prior protocols.

If a network cannot transmit RIP data to a printer fast enough to feed a print engine, the printer must periodically pause and wait for additional raster information to be received. In an ink jet printer, these pauses may result in a banding effect because the pause may cause the ink deposited during the preceding pass of the print head to dry before the next pass can occur, while most other passes will occur continuously so the ink will not dry between successive passes. When the ink is not dry, the ink deposited during successive passes will blend together and minimize banding. Conversely, if the ink is permitted to dry between successive passes, banding will be more pronounced.

SUMMARY OF THE INVENTION

The present invention is a high-capacity protocol for packet based networks. The protocol defines a first sub-protocol for negotiating a connection and preparing to transmit a print job, and a second sub-protocol for transmitting a large quantity of printer data, such as a RIPed document. The second sub-protocol allows the recipient of the data to dictate the order in which various types of data are transmitted, while allowing for efficient error correction of lost and/or corrupted packets.

In one embodiment, a server is configured to transmit data to a client using the protocol of the present invention. In another embodiment, a client is configured to receive data from the server according to the protocol of the present invention.

BRIEF DESCRIPTION OF THE DRAWINGS

FIGS. 9A–9D is a timing flowchart showing the protocol of the present invention.

DETAILED DESCRIPTION OF THE PREFERRED EMBODIMENTS

Figure 1:
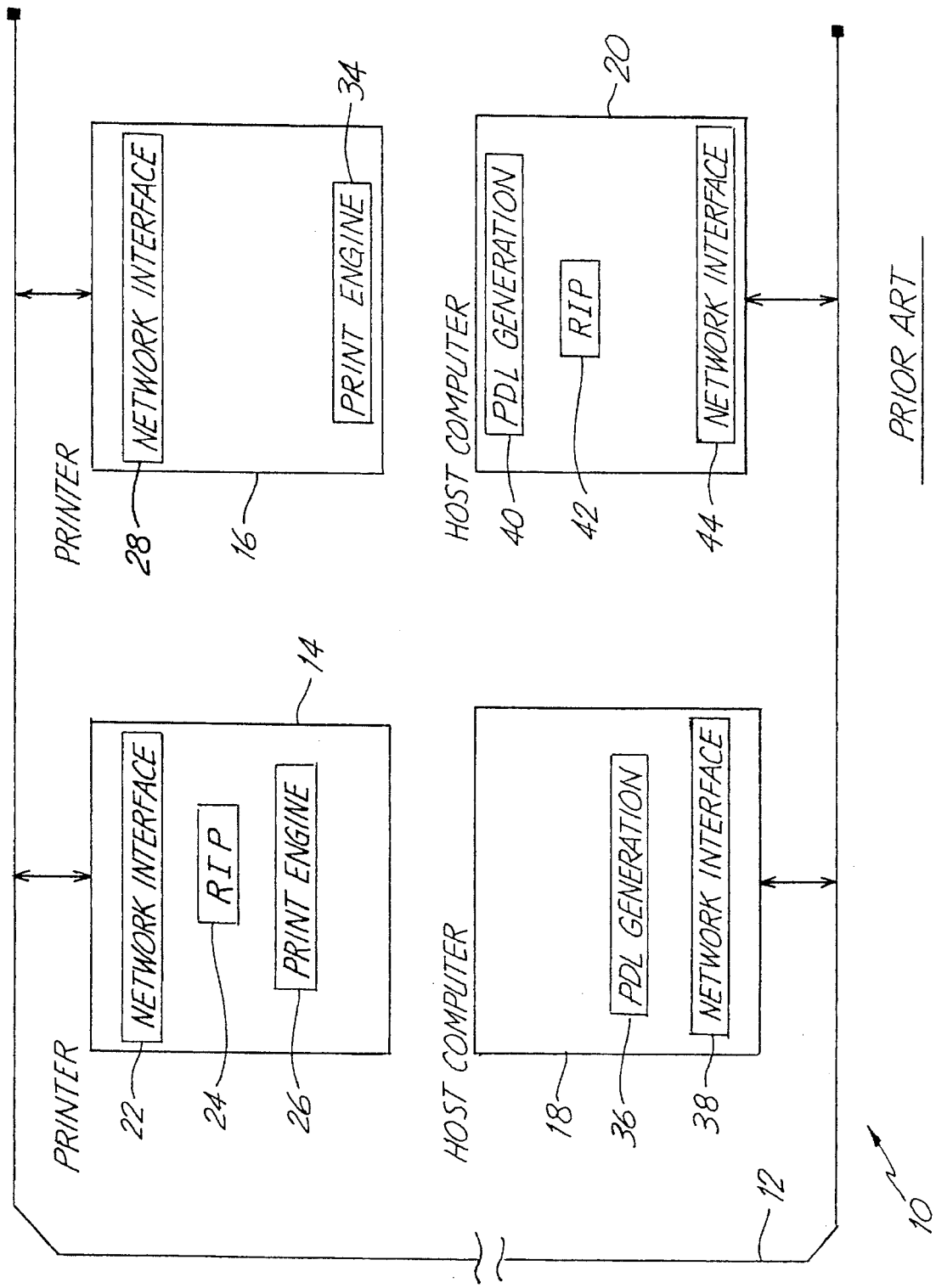
FIG. 1 is a block diagram of a typical prior art networked computing system.

FIG. 1 is a block diagram of a typical prior art networked computing system 10. System 10 is comprised of network bus 12, printing devices 14 and 16, and host computers 18 and 20.

When either computer system 18 or 20 desires to print a document, it assembles page description language (PDL) instructions represented in FIG. 1 by PDL generation modules 36 and 40 in computer systems 18 and 20, respectively. PDL generation modules 36 and 40 may be a word processor, a desktop publishing program, a CAD program, or any other program resident at the host computer that is capable of generating a series of PDL instructions. Additionally, modules 36 and 40 may provide PDL instructions that were previously generated and are now stored on storage media, such a hard disc drive. Examples of PDLs include Adobe's PostScript® language, Hewlett Packard's HP-GL/2 language, and the PCL printer control language.

Before a printer can print the document, the series of PDL instructions must be processed by a raster image processor (RIP) to form a raster image. This process is known in the art as raster image processing, or RIPing. The raster image is a bit-mapped representation of the document to be printed, with each bit in the bitmap representing the absence or presence of a dot (or pixel) on the printed page.

In the prior art, it was common for the printer to include a RIP. For example, in FIG. 1 host computer 18 generated a series of PDL instructions at PDL generation module 18, and the instructions were sent through network interface 38 to network 12. A printer such as printing device 14 received the PDL instruction from network 12 through network interface 22, processed PDL instructions into a raster image at RIP module 24, and printed the raster image at print engine module 26. Print engine module 26 may represent any type of printer known in the art, such a laser printer or an ink jet printer.

The process of converting an image from a series of PDL instructions into a raster image requires a large amount of computation and generates a vast quantity of data. For example, to generate a raster image of an 8½×11 inch black and white page at a resolution of 300 dots per inch (dpi) requires approximately a megabyte of data, while a similar four-color document requires approximately four megabytes of data. Because of the computational resources required to produce a raster image, the printer's RIP is often the bottleneck that determines the throughput of the printer.

One solution to this problem is to provide a RIP in the host computer, and send the processed raster image from the host computer to the printer. With the advent of powerful microprocessors such as the 80486, Pentium™, and PowerPC™ microprocessors, PIPing can be performed in the background by a host system without the user perceiving significant system degradation. In addition, this solution lowers the cost of the printer because the printer need not be provided with a RIP.

In FIG. 1 RIP module 42 of host system 20 processes a sequence of instructions from PDL generation module 20 to form a raster image. The processed raster image is then sent to a printer via network interface 44 and network 12. Because the raster image has already been generated, the document can be printed by a printer not having a RIP, such as printing device 16 in FIG. 1. In printing device 16, the raster image is received from network 12 via network interface 28, and provided to print engine 34. Alternately, the raster image can be provided to a printer having a RIP, such as printer 14, in which case the raster image will be provided directly to the print engine.

One complication that arises when the RIP is provided in a host computer is that the RIP may not have information about the printer's media and ink colors. When the RIP is in the printer, in theory the RIP will know how to properly interpret a color represented in a PDL instruction. For example, to generate a certain shade of red specified in the PDL instructions, the printer will have to deposit onto the print medium a combination of ink dots at certain ratios and positions. For a given color specified in a PDL instruction, the required combination and ratio will vary from printer to printer. When the RIP is in the host computer, a user must preset parameters of the RIP based on media information of the printer that will print the raster image.

Since individual host computers can RIP PDL instructions in parallel, and the print engine can print a raster image as soon as it receives it, the only other factor which can prevent a printer from printing at the maximum speed of its print engine is the bandwidth of the network.

Many networks conform to the IEEE 802.3 Ethernet specification, which defines the hardware requirements of the network, the size of data packets that are transported by the network, and a data communication standard defined by the International Standards Organization called Open Systems Interconnection. The standard is generally referred to as ISO-OSI. The ISO-OSI communication standard defines a seven layer stack of primitives that ensures accurate data transfers between the physical Ethernet hardware and applications accessing the network. Protocols that implement the ISO-OSI standard include TCP/IP, IPX/SPX, and Apple-Talk®/EtherTalk®.

Figure 2:
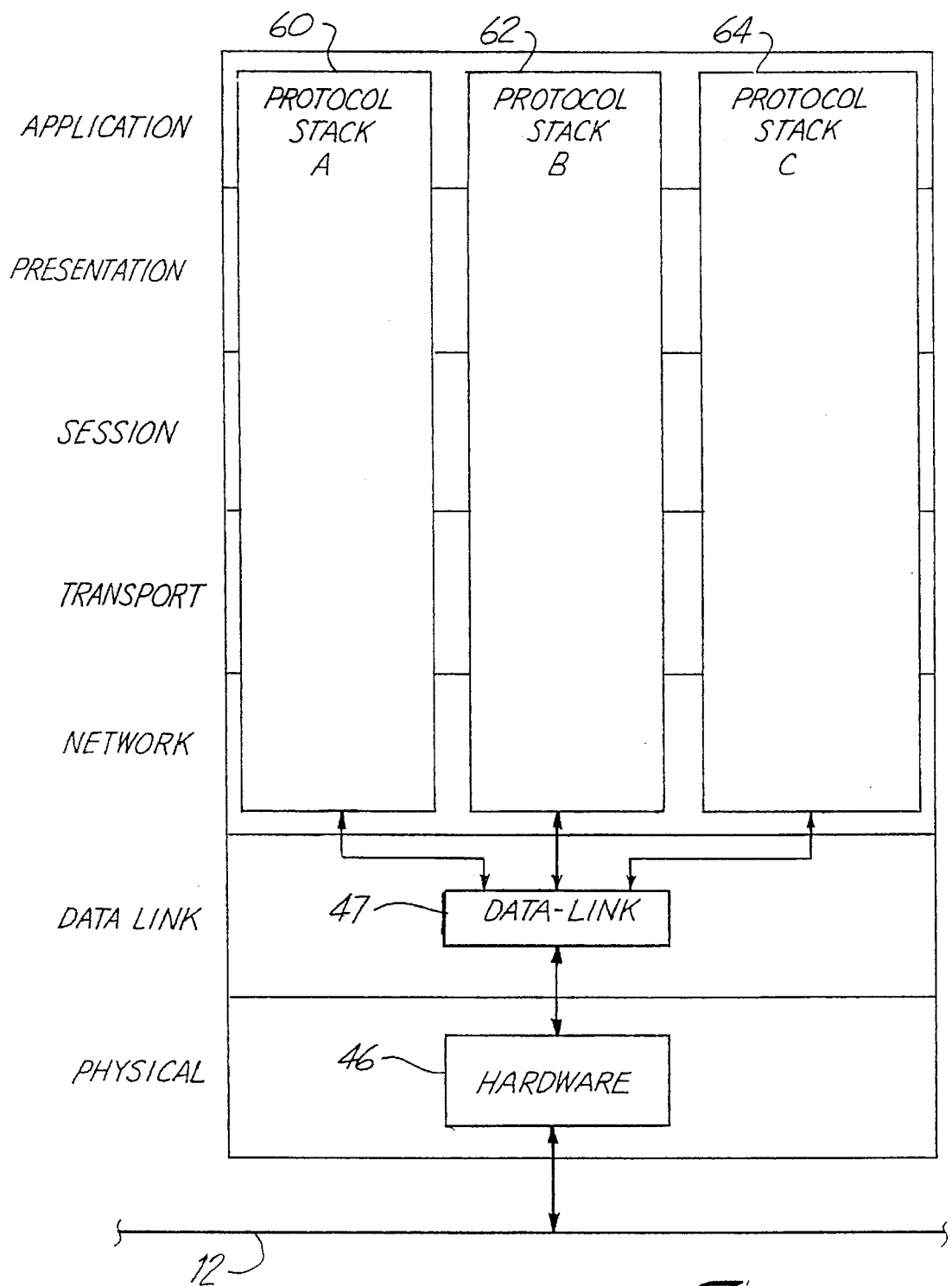
FIG. 2 is a diagram showing the International Standards Organization-Open Systems Interconnection (ISO-OSI) communication standard.

FIG. 2 is a diagram showing the ISO-OSI communication standard. With the exception of the application layer, this diagram represents network interfaces 22, 28, 38, and 44 in FIG. 1. The lowest (or first) layer is the physical layer, which represents network interface hardware 46. Network interface hardware 46 is responsible for transmitting data packets to and receiving data packets from network bus 12 and will be described in greater detail below with reference to FIG. 3.

The second layer is the data-link layer which represents data-link module 47. When receiving data from the network, data-link module 47 retrieves a data packet from local memory in the hardware 46 and examines the data packet to determine whether the packet conforms to one of the supported protocols. In FIG. 2, protocol stack 60 represents protocol A, protocol stack 62 represents protocol B, and protocol stack 64 represents protocol C. If the packet conforms to a supported protocol, the packet is provided to the network layer of the protocol stack of the protocol associated with the packet. When sending data to the network, data-link module 47 receives a data packet from the network layer of a protocol stack and provides the packet to the physical layer for transmission to the network.

The remaining five layers of the ISO-OSI standard are the network, transport, session, presentation, and application layers. The application layer represents the application that is communicating with the network. The other four layers perform various functions such as encoding and decoding addresses of packets, high level error correction, partitioning data into packets, maintaining packet order and flow control, implementing process-to-process data flow, and formatting data for applications.

Generally, as data flows from layer to layer, it is repeatedly transferred and copied from a memory area associated with one layer to a memory area associated with another layer. Typically, each packet contains bits that are reserved for and used by each layer. These bits detract from the amount of space left in the packet available for RIP data.

Figure 3:
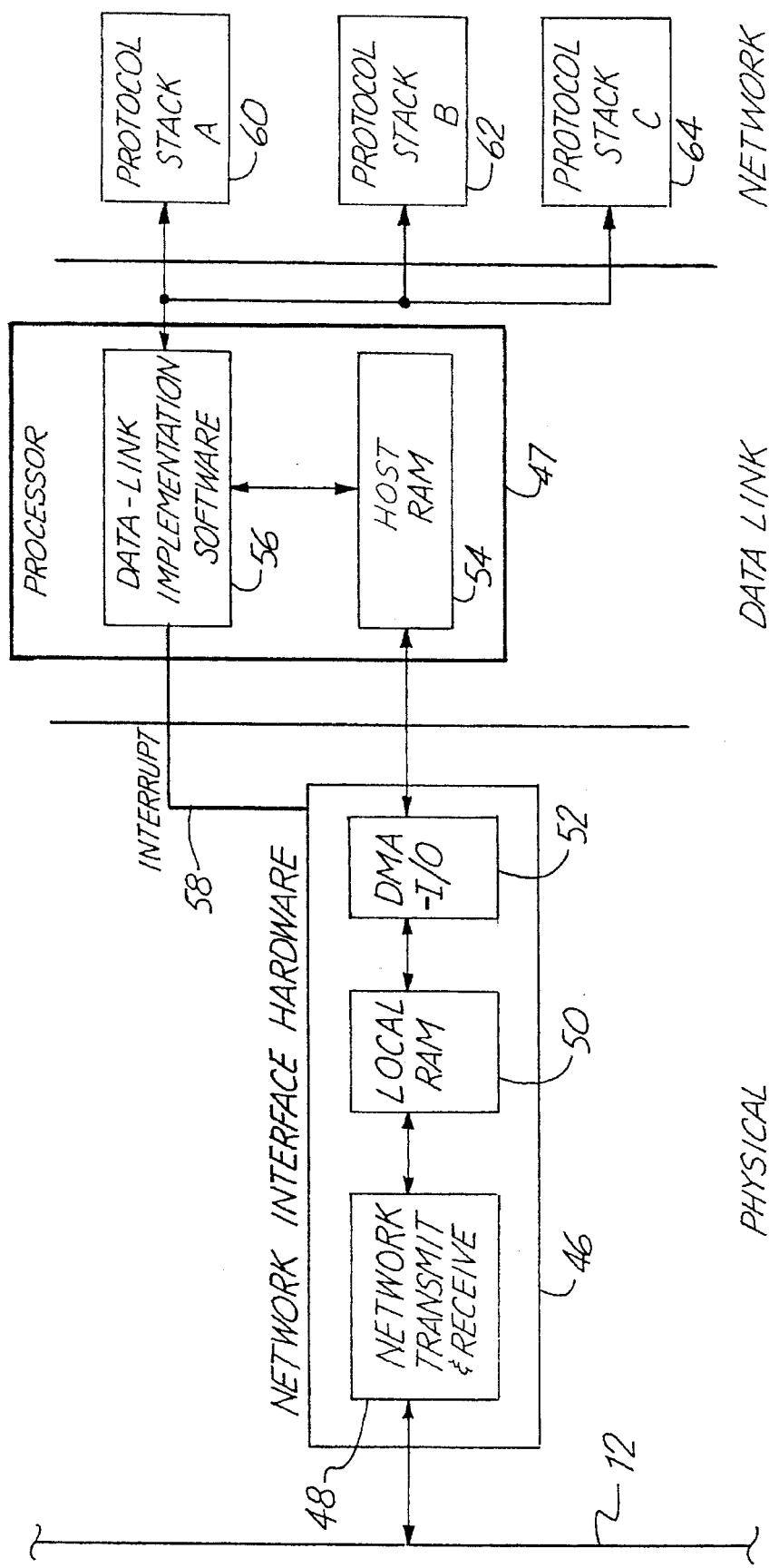
FIG. 3 is a block diagram showing a typical prior art implementation of the physical, data-link, and network layers.

FIG. 3 is a block diagram showing a typical prior art implementation of the physical, data-link, and network layers. The physical layer comprises network interface hardware 46, which includes network transmit and receive module 48, local RAM 50, and DMA-I/O module 52. The data-link layer comprises data-link module 47, which includes host processor RAM 54 and datalink implementation software 56. Finally, the network layer is comprised of a portion of each of the protocol stacks 60, 62, and 64.

Typically, network transmit and receive module 48 includes digital-to-analog converters, analog-to-digital converters, modulators, demodulators, and other components known in the art and required to convert the signals carried by network 12 into digital data suitable for manipulation by a computer system. When a data packet is received, module 46 stores the data packet in local RAM 50 and signals data-link module 47 by asserting interrupt 58. Data-link implementation software 56 responds by requesting DMA-I/O module 52 to transfer the contents of local RAM 50 into host processor RAM 54.

In prior systems, a complete data packet is transferred from the local RAM of the physical layer to the host processor RAM of the data link layer, even if the data packet contained data formatted in accordance with an unsupported protocol. In addition, the whole packet must be transferred up and down the protocol stacks, even if only a few bytes of data in the data packet were required by the application layer. Since the IEEE 802.3 Ethernet specification defines a minimum packet size of 64 bytes, a large number of bytes were transferred from one memory location to another unnecessarily.

The layers defined by the ISO-OSI standard ensure accurate and reliable data transfers between computer resources connected by an Ethernet network. The layers also ensure modularity and compatibility because the vendor of a product need only design the product to communicate with an adjacent layer. For example, a word processor (which is represented by the application layer) must only communicate with the presentation layer. Likewise, Ethernet hardware need only communicate with the data-link layer.

While the ISO-OSI standard ensures accuracy, reliability, modularity, and compatibility, these attributes are achieved at the expense of speed. The continual copying of data (even unneeded data) from one memory location to another, the frequent handshaking that provides accuracy and reliability, and the bits reserved for each layer detract from potential throughput that could be obtained by a network based on the IEEE 802.3 Ethernet specification.

Figure 4:
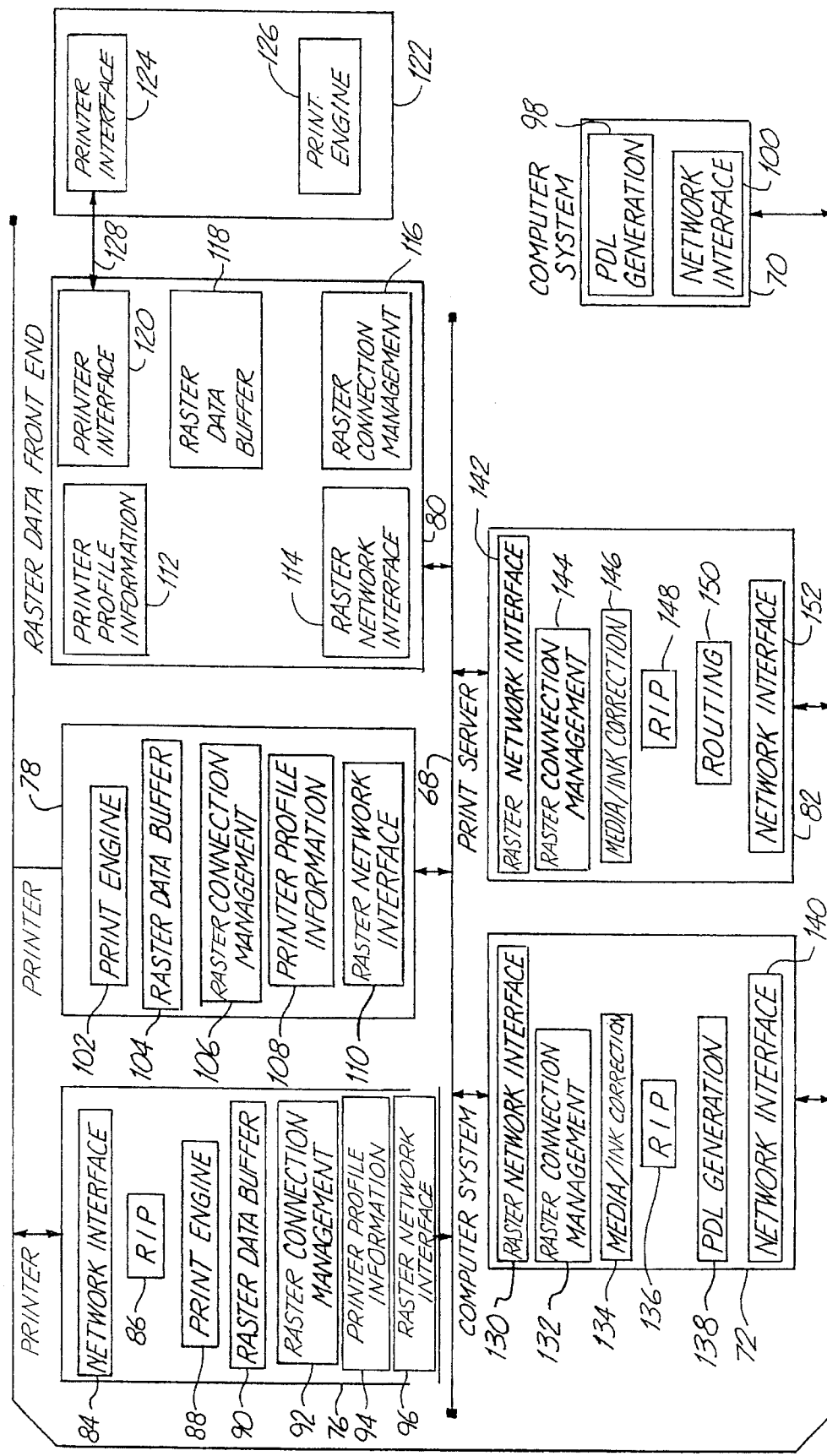
FIG. 4 is a block diagram of a computing system in accordance with one presently preferred embodiment of the present invention.

FIG. 4 is a block diagram of a computing system 65 in accordance with one presently preferred embodiment of the present invention. System 65 includes a conventional network bus 66, as is known in the art, and a raster network bus 68. Raster network bus 68 is a dedicated network designed to transmit raster data from a RIP to a printer.

In FIG. 4, computer systems 70 and 72, printer 76, and print server 82 are connected together via network bus 66. Computer system 72, printers 76 and 78, raster data front end 80, and print server 82 are connected together via raster network bus 68.

Printer 76 includes network interface 84, RIP 86, print engine 88, raster data buffer 90, raster connection module 92, printer profile information module 94, and raster network interface 96. Since printer 76 is provided with a RIP, printer 76 can accept and process PDL instructions. For example, computer system 70, which includes PDL generation block 98 and network interface 100, but does not include a RIP, can send PDL instructions through network interface 100 to network bus 66. Printer 76 can receive the PDL instructions through network interface 84, RIP the instructions into a raster image at RIP 86, and print the raster image at print engine 88.

Printer 76 is also coupled to raster network bus 68 via raster network interface 96. Raster connection management 92 maintains unique virtual connections between printer 76 and devices providing raster data, and raster data buffer 90 stores raster data in preparation for printing the raster data at print engine 88. In one embodiment, raster data buffer 90 is large enough to ensure that print engine 88 can print a complete page at its maximum speed, thereby minimizing the banding effect associated with ink from a previous scan drying before the next scan. In another embodiment, raster data buffer 90 is large enough to store at least one complete raster image of a document, thereby allowing multiple copies of the same document to be printed without requiring reRIPing of the PDL instructions, and without retransmitting the raster image over the network. In yet another embodiment, raster data buffer 90 is large enough to store two or more raster images, thereby allowing print engine 88 to print one image while raster data buffer 90 receives another. In this embodiment, images may be stored in a FIFO queue and printed on a first-in first-out basis, or prioritized in some other manner. If raster data buffer 90 is sufficiently large, raster images may be permanently stored in buffer 90, and repeatedly printed at the initiation of the user. Because raster data buffer 90 must hold vast amounts of data, in a preferred embodiment of the present invention, buffer 90 comprises at least one hard disc drive.

Printer 76 and 78 are also provided with profile information modules 94 and 108, respectively. Profile information modules 94 and 108 provide media and ink profile information to computer systems that RIP PDL instructions, as will be explained below.

Printer 78 includes print engine 102, raster data buffer 104, raster connection management 106, printer profile information module 108, and raster network interface 110. The elements referenced in printer 78 perform the same functions as the identically named elements in printer 76. However, printer 78 does not include a RIP nor a conventional network interface. Accordingly, printer 78 does not process PDL instructions such as those from computer system 70, but can only process RIP data provided via raster network bus 68.

Printers 76 and 78 are designed to utilize the system of the present invention. However, simpler printers may also be provided with raster data front end 80 to take advantage of the features of the present invention. Raster data front end 80 includes printer profile information module 112, raster network interface 114, raster connection management 116, raster data buffer 118, and printer interface 120. Printer 122 is coupled to raster data front end 80 and includes printer interface 124 and print engine 126. Printer interface 124 of printer 122 and printer interface 120 of raster data front end 80 are connected by line 128 and together may form any common interface as in known in the art, such as a parallel interface, a serial interface, a SCSI interface, etc. With the exception of printer interfaces 120 and 124, the elements referenced in raster data front end 80 and printer 122 perform the same functions as the identically referenced elements of printer 78.

Computer system 72 is comprised of raster network interface 130, raster connection management module 132, media/ink correction module 134, RIP 136, PDL generation module 138, and network interface 140.

Network interface 140 provides access to conventional network 66 for typical network operations, such as file access, E-mail, and the like. PDL generation module 138 represents a device that provides PDL instructions, such as a word processor, a CAD program, or a storage device storing previously generated PDL instructions.

RIP 136 processes the PDL instructions into a raster image. Thereafter, raster connection management module initiates a connection dialogue with printers coupled to raster network bus 68. The connection dialogue results in a virtual connection being opened to a selected printer and will be described in greater detail below.

After a printer is selected, the selected printer provides media and ink information from the printer's printer profile information module (or the printer profile information module of the raster data front end attached to the printer). The information includes the print media presently engaged by the printer, including thickness, transparency and reflectivity characteristics, size, and other factors affecting the print media. The ink information includes the ink lot number, color, and chromatic characteristics of the inks. Media/ink correction module 134 uses the media and ink information of the selected printer to adjust for media and ink differences between printers to produce corrected raster image data. Raster connection management module 132 then transmits the corrected raster image data through raster network interface 130 and raster network bus 68 to the selected printer.

Print server 82 is a device configured to receive PDL instructions from a computing device coupled to network 66, RIP the PDL instructions, and provide the resulting raster data to a printer via raster network bus 68. Print server 82 includes raster network interface 142, raster connection management module 144, media/ink correction module 146, RIP 148, routing 150, and network interface 152. Print server 82 is provided to receive a document represented by a series of PDL instructions from a computer system not coupled to raster network bus 68, such as computer system 70, or simply to off-load RIP processing from another computer system. Routing module 150 is provided to route printing jobs to a selected printer, and provide print job status information back to the computer system that originated the print job. The other referenced elements of print server 82 perform the same functions as the identically referenced elements of computer system 72.

Figure 5:
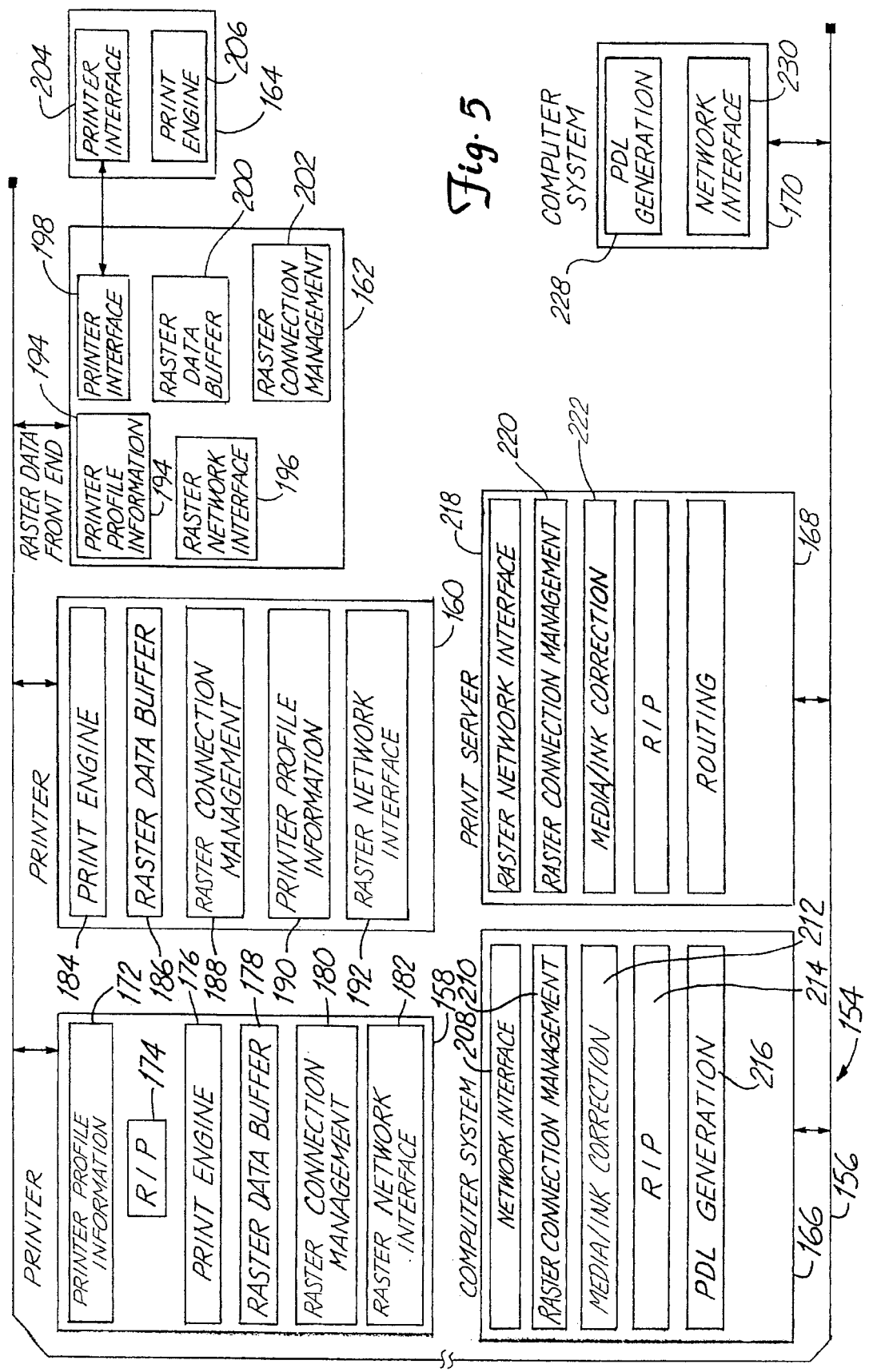
FIG. 5 shows a networked computing system in accordance with a second embodiment of the invention.

FIG. 5 shows a networked computing system 154 in accordance with a second embodiment of the invention. In system 154, the conventional network and the raster network share the same physical network 156. In addition to network 156, system 154 includes printers 158, 160, and 164, raster data front end 162, computer systems 166 and 170, and print server 168.

Printer 158 includes printer profile information module 172, RIP 174, print engine 176, raster data buffer 178, raster connection management module 180, and raster network interface 182. Printer 160 includes print engine 184, raster data buffer 186, raster connection management module 188, printer profile information module 190, and raster network interface 192. Raster data front end 162 includes printer profile information module 194, raster network interface 196, printer interface 198, raster data buffer 200, and raster connection management module 202. Printer 164 includes printer interface 204 and print engine 206.

Computer system 166 includes raster network interface 208, raster connection management module 210, media/ink correction module 212, RIP 214, and PDL generation 216. Print server 168 includes raster network interface 218, raster connection management 220, media/ink correction module 222, RIP 224, and routing module 226. Finally, computer system 170 includes PDL generation 228 and network interface 230.

Generally, the elements referenced in FIG. 5 perform the same functions as similarly labeled elements in FIG. 4. However, the raster network interfaces of printers 158 and 160, raster data front end 162, computer system 166, and print server 168 communicate via the network using standard ISO-OSI protocols, as well as the unique raster data protocol defined by the present invention.

Figure 6:
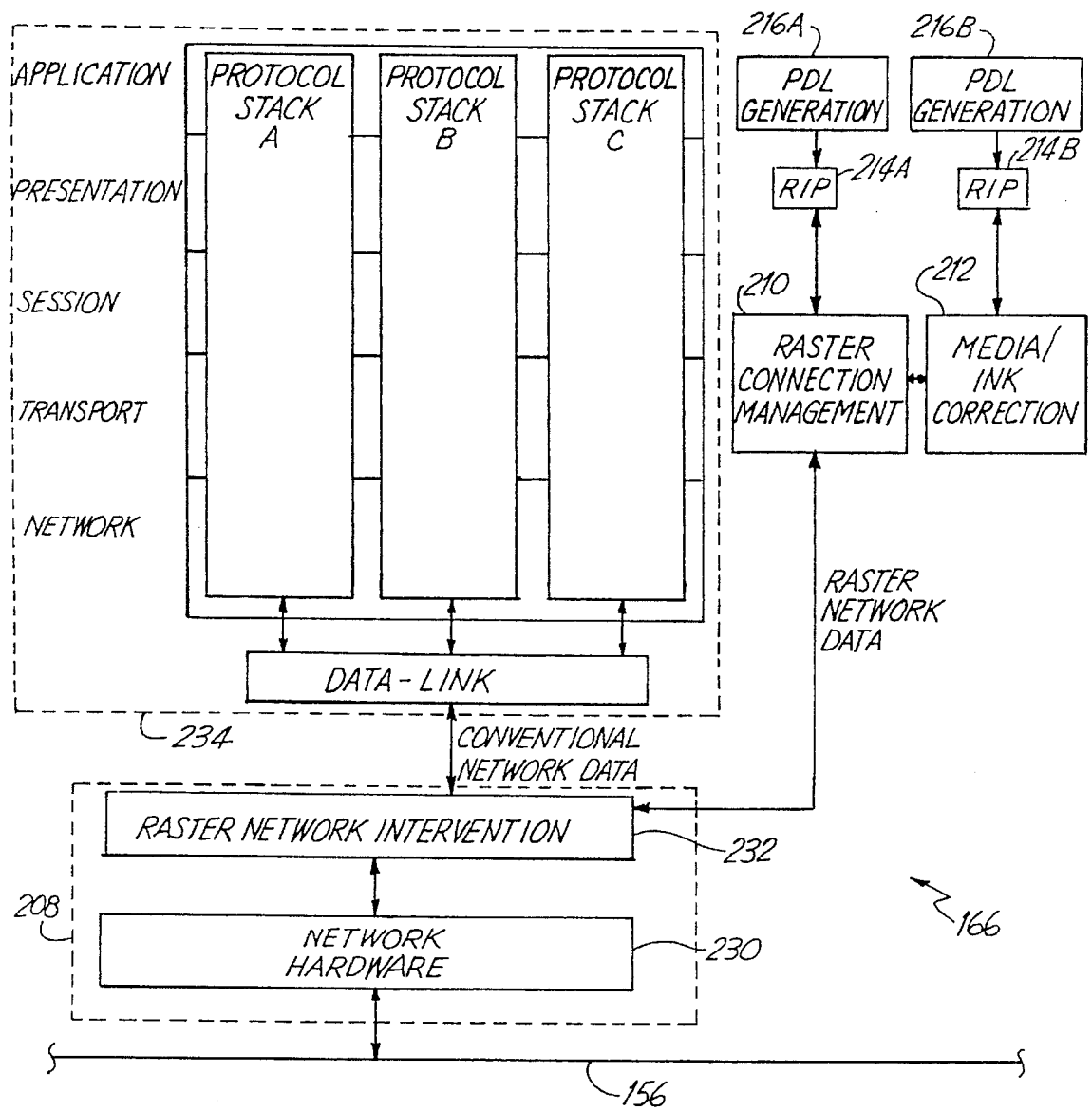
FIG. 6 shows a computer system shown in FIG. 5.

FIG. 6 shows computer system 166 of FIG. 5. In FIG. 6, network hardware 230 of raster network interface 208 is coupled to network 156. Raster network intervention module 232 of interface 208 intervenes between network hardware 230 and raster connection management module 210 and conventional protocol layers 234. FIG. 6 is also representative of print server 168 of FIG. 5. In the embodiment shown in FIG. 4, FIG. 6 is representative of computer system 72 and print server 82, however, conventional protocol layers 234 are not present.

Protocol layers 234 implement the ISO-OSI standard shown in FIG. 2. When a data packet is received by network hardware 230, raster network intervention module 232 examines the packet and determines whether the packet contains raster data. If it does, raster network intervention module 232 sends the relevant portion of the data packet to raster connection management module 210.

In one embodiment of the present invention, module 232 sends any packets that are not raster data packets to conventional protocol layers 234, thereby providing maximum modularity with an existing implementation of conventional protocol layers 234. In another embodiment of the present invention, raster network intervention module 232 is aware of the protocols supported by conventional protocol layers 234, and ignores any packets that are not supported. In this embodiment, the functions of the data link layer and the raster network intervention module may be incorporated into a single module.

Raster connection management module coordinates virtual connections between RIPs and printers. In other embodiments, raster connection management module 210 compresses raster data, decompresses raster data, encrypts raster data, and decrypts raster data as is known in the art. Module 210 also requests printer profile information from a selected printer, and adjusts outgoing raster data at media/ink correction module 212 based on media and ink characteristics of the selected primer.

In FIG. 6, PDL generation modules 216A and 216B provide PDL instructions that are RIPed by RIPs 214A and 214B, respectively. Computer system 166 may have any number of RIPs, which are coordinated by raster connection management module 210. Raster connection module 210 then sends raster data to the selected primer via network bus 156 using the transmission protocol of the present invention, which is described below.

Figure 7:
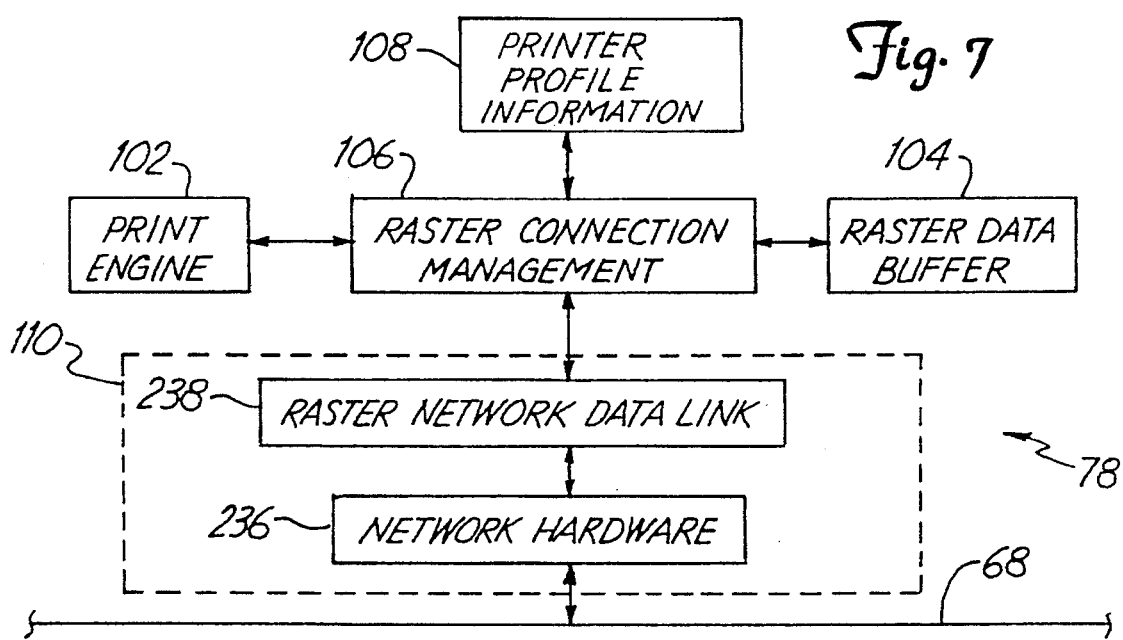
FIG. 7 shows a printer shown in FIG. 4.

FIG. 7 shows primer 78 of FIG. 4. Primer 78 is only coupled to raster data network bus 68 and includes print engine 102, raster data buffer 104, raster connection management 106, and raster network interface module 110. Raster network interface module 110 includes raster network data link module 238 and network hardware 236. If printer 78 were configured to support other protocols, primer 78 would be provided with conventional protocol layers 234 of FIG. 6, and raster network data link module 238 would be replaced with raster network intervention module 232 of FIG. 6.

Figure 8:
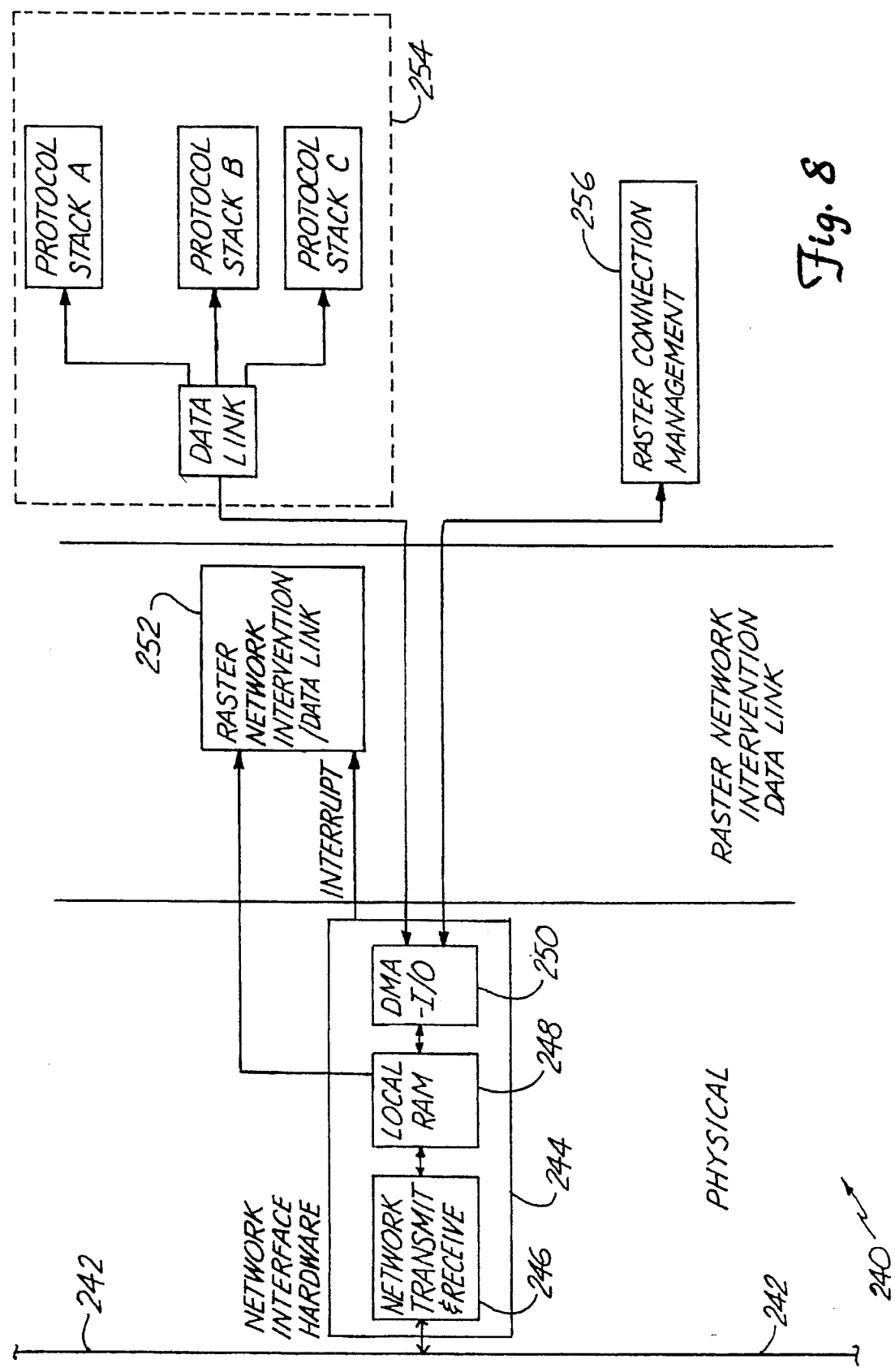
FIG. 8 shows a raster network interface that is generic to a network system wherein the raster data network and the conventional data network share the same physical media such as that shown in FIG. 5, and a network system wherein the raster data network and the conventional data network have separate data networks such as that shown in FIG. 4.

FIG. 8 shows a raster network interface 240 that is generic to a network system wherein the raster data network and the conventional data network share the same physical media such as that shown in FIG. 5, and a network system wherein the raster data network and the conventional data network have separate data networks such as that shown in FIG. 4.

Network interface 240 comprises network hardware 244 and raster network intervention/data link module 252. Also shown in FIG. 8 are network bus 242, raster connection management module 256, and conventional protocol stack 254.

Network hardware 244 includes network transmit and receive module 246, local RAM 248, and DMA-I/O module 250. Network transmit and receive module 246 is coupled to network bus 242 and includes digital-to-analog converters, analog-to-digital converters, modulators, demodulators, and other elements required to transmit and receive data from network bus 242. Local RAM 248 is provided to store data that has just been received from the network or is about to be transmitted to the network. DMA-I/O module 250 is provided to transfer the contents of local RAM 248 to protocol layers 254 or raster connection management module 256, or alternately, to transfer data from layers 254 or module 256 into local RAM 248.

The present invention implements a method of receiving data that greatly reduces overhead processing and data transfer. As discussed above with reference to FIG. 3, in the prior art a received packet is always transferred from local RAM into other RAM that is part of the data link layer.

In contrast, the present invention allows raster network intervention/data link module 252 to examine the contents of local RAM 248. If the contents of RAM 248 are formatted in accordance with a supported protocol, module 252 directs DMA-I/O module 250 to transfer data from local RAM 248 to conventional protocol layers 254 or raster connection management module 256. However, if the contents of RAM 248 do not conform to a supported protocol, the contents are ignored.

In addition, only required data need be transferred from local RAM 248. While the IEEE 802.3 Ethernet specification defines a minimum packet size of 64 bytes, some commands that are transmitted over a network require only a few bytes of the packet. Only the required bytes need to be transferred from local RAM 248, thereby minimizing the amount of data that must be transferred from local RAM 248.

When a computer system or print server system desires to print a document, the system enters into a connection dialogue using the protocol of the present invention. As described herein, the term "server" refers to a network entity that transmits RIP data to a "client". In some circumstances, it may be desirable to have a printer transmit RIP data back to a host computer system or another printer. For example, if a printer received RIP data representing a document and stores the RIP data in a raster data buffer, and the printer later runs out of ink, the RIP data can be transferred back to the host or to another printer.

The IEEE 802.3 Ethernet specification defines three types of packet addressing modes, directed, broadcast, and multicast. All three modes are supported by the protocol of the present invention. A directed packet is sent to a single device on the network having a unique network address. A broadcast packet is sent to all devices on the network, and a multicast packet is sent to a subset of devices on a network.

The protocol of the present invention defines two types of packets, command packets and data packets. Data packets are used to transfer raster data to printers, and are "connected packets", meaning they are only transmitted in association with a previously established virtual connection. Data packets are directed packets, and are further classified based on the type of raster data they carry. Command packets, on the other hand, may be "connected" or "connectionless packets", and also may be directed, broadcast, or multicast.

Figure 9A:
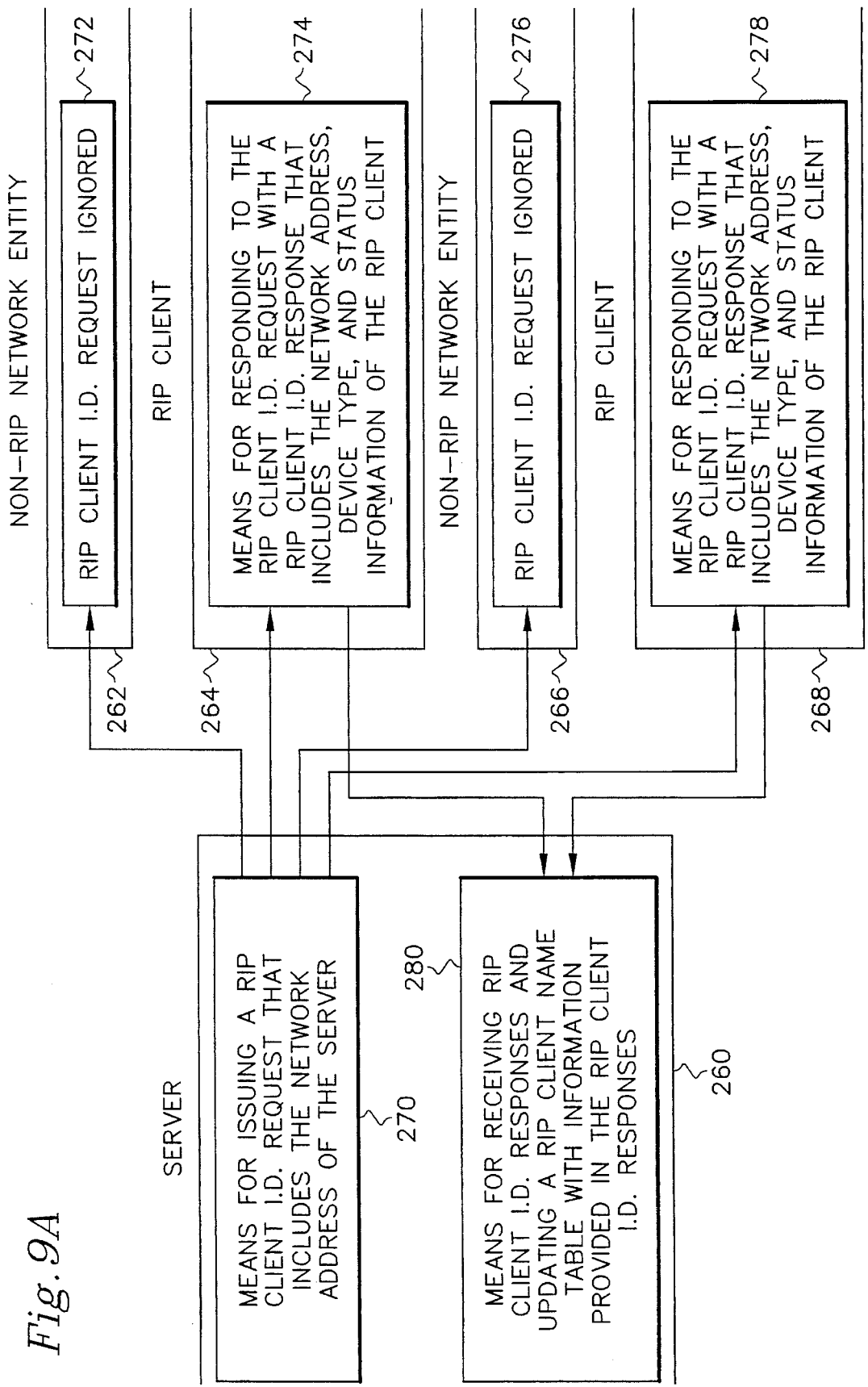

Servers maintain a table of clients capable of receiving RIP data. Generally, a server polls all clients at start-up, and also at periodic intervals. FIG. 9A illustrates a server 260 issuing a RIP client ID request over a network. In FIG. 9A, server 260 includes means 270 for issuing a RIP client ID request that includes the network address of server 270. In general, the RIP client ID is a multicast to all printing devices and is contained in a connectionless packet. However, it can also be multicast to a subset of printers, or directed to an individual printer.

Non-RIP network entities 262 and 266 include means 272 and 274, respectively, for ignoring the RIP client ID request. RIP clients 274 and 268 include means 274 and 278, respectively, for responding to the RIP client ID request with a RIP client ID response that includes the network address, device type, and status information of the RIP client. Each RIP client ID response is contained in a directed, connectionless packet that addresses server 260. Server 260 includes means 280 for updating a RIP client name table based on each received RIP client ID response. In one embodiment of the present invention, the name RIP clients also provide profile information in response to a RIP client ID request, as discussed above.

When a server desires to initiate a transfer of RIP data, the server must select a client. The server may access its RIP client name table, or it may initiate a fresh RIP client ID request. The server must also select a RIP client capable of accepting the print job. In FIG. 9B, server 260 includes means 282 for selecting a RIP client to which data will be transmitted. In one embodiment of the present invention, server 260 request the selected RIP client to provide profile information.

After the RIP client has been selected, means 284 of server 260 issues an open connection request to the RIP client selected by means 282. The open connection request includes the network address of server 260, a unique server connection ID, the number of streams to be supported by the connection, and the maximum number of packets containing RIP data that the server can transmit in a single burst. The number of streams will vary based on the type of printer. For example, a CYMK color printer will require at least four streams. While the server may request more streams than required by the printer, it may not request fewer streams than required by the printer. The open connection request is contained in a directed, connectionless packet.

Rip client 264 includes means 286 for receiving an open connection request from the server. Client 264 determines the maximum number of packets that can be transmitted in a single burst. This number of packets will be the lower of the maximum number of packets that the server can transmit, which was provided by the server in the open connection request, or the maximum number of packets that the client can receive. In other words, if server 260 indicated in the open connection request that it could send up to 32 packets in a single burst, and client 264 can receive up to 64 packets in a single burst, the number of packets that will be transmitted in a single burst is 32. In response to the open connection request, means 288 transmits an open connection response to the server that includes a unique client connection ID and the maximum number of packets of RIP data that will be transmitted in a single burst. The open connection response is contained in a directed, connectionless packet.

Means 290 of server 260 receives the open connection response and forms a unique connection ID from the unique server connection ID and the unique client connection ID. At this point, a unique virtual connection has been established.

Thereafter, means 292 issues a job information request to the client that includes a job type, the number of copies of the document to be printed by the printer, the number of pages of the document, and a width and a height for each page, wherein the width is in bytes and the height is in scan lines. The job information command is contained in a connected packet. In one embodiment, the job type comprises a series of instructions that are executed by the client. The instructions tell the client how to process the RIP data.

Means 294 of client 264 receives the job information request and determines whether it can accept the print job. Means 296 transmits a job information response to server 260 that either accepts or rejects the request. If client 264 accepts the request, the job information response also includes printer profile information, as discussed above. Means 298 of server 260 accepts the job information response and issues a new page command, which is received by means 300 of client 264.

Until this point, the dialogue was initiated by server 260. Server 260 would issue a single packet containing a command, and would expect a single packet containing a reply within a certain time interval. In essence, the first portion of the dialogue uses a first sub-protocol. During transmission of a page, client 264 initiates the dialog, and the RIP data comprising a page is transmitted using a second sub-protocol.

Means 302 of client 264 sends an acknowledge/request to server 260. The acknowledge/request is contained in a connected packet and serves two purposes. First, it acknowledges all data received so far and requests a quantity of new data from a specified stream. Depending on the printer type, the specified stream will either change from burst to burst, or will remain the same until all data associated with the stream has been transmitted. For example, an ink jet printer will continuously apply inks of different colors. Such a printer may first require a burst of black RIP data, then a burst of cyan RIP data, followed by a burst of yellow RIP data, and then a burst of magenta RIP data. This cycle will repeat until the page has been printed. On the other hand, other types of printer may render a complete color plane of an image in a single pass. Such a printer would first request all the RIP data associated with a first plane, then print the first plane, request all the RIP data associated with a second plane, print the second plane, and so forth until all data is received. The acknowledge/request command defined by the protocol of the present invention allows the printer to dictate the order in which different streams of data are transmitted and received. As each packet is transmitted, it is assigned a unique sequence number. Because the order that streams are transmitted is dynamically determined by the client, the sequence numbers associated with individual packets are not known until transmission.

Figure 9C:
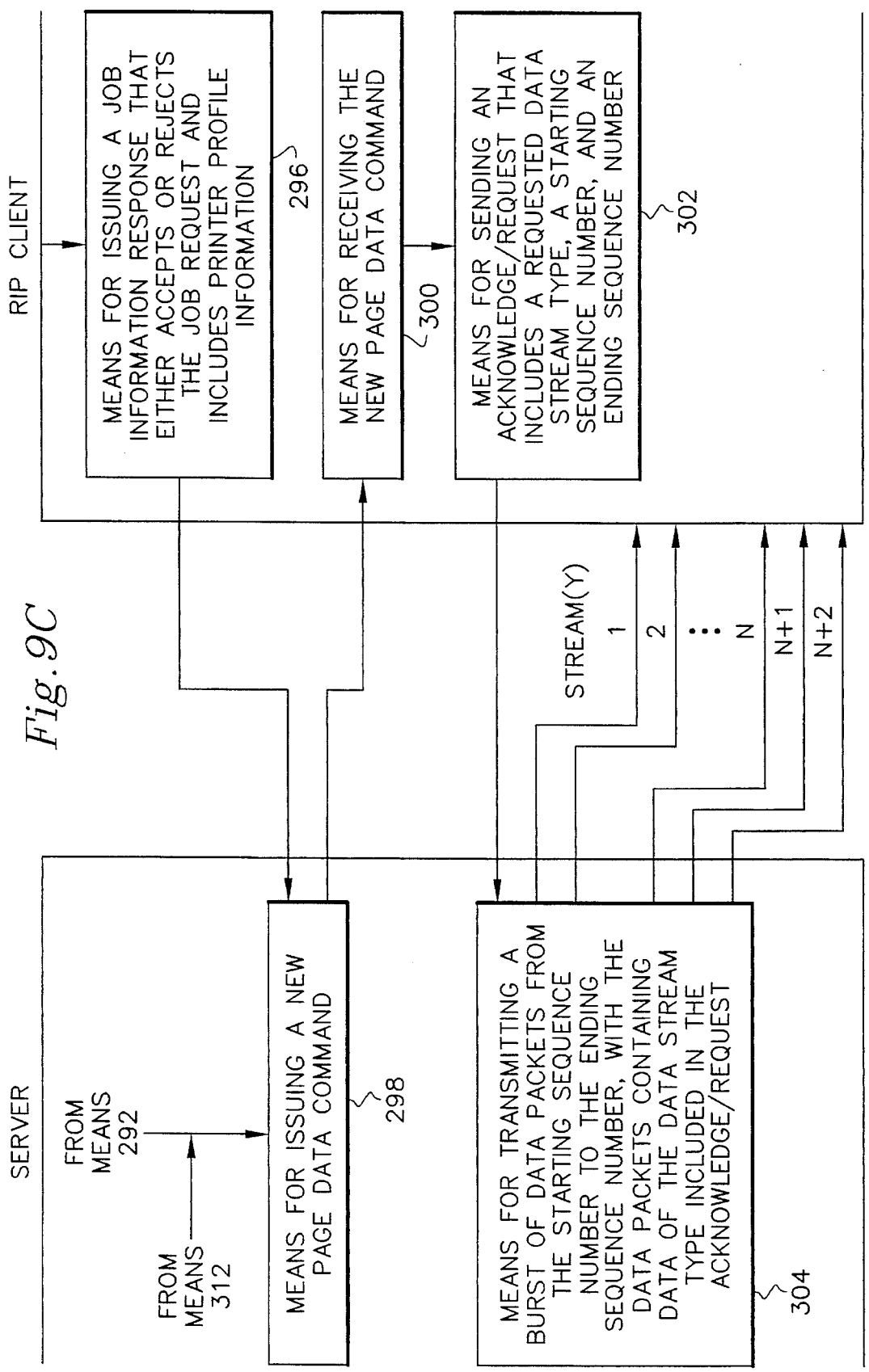
Figure 9D:
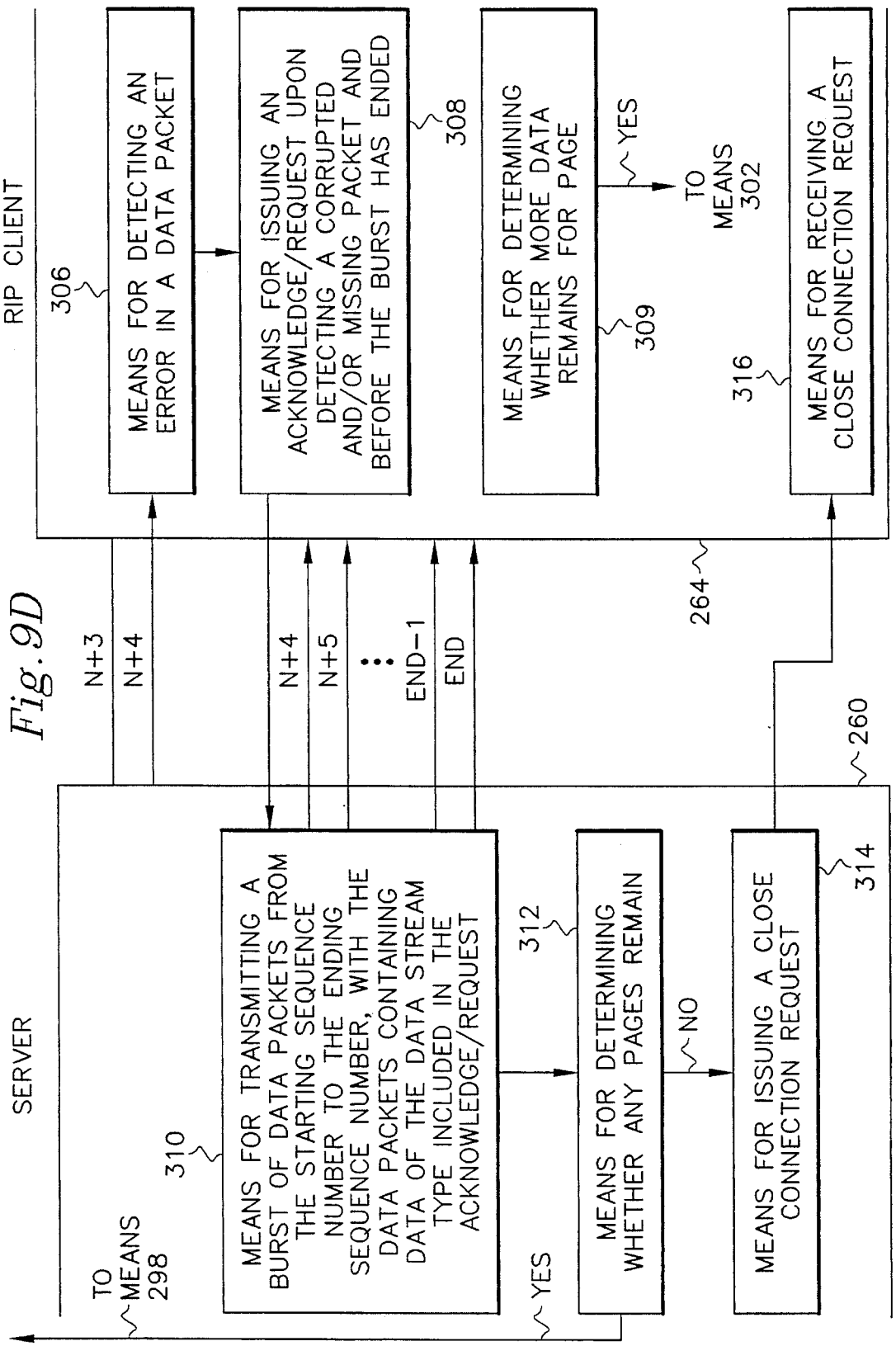

Once means 304 of server 260 received the acknowledge/request, means 304 begins transmitting a burst of data packets from stream specified by the server and from a starting sequence number to an ending sequence number. Each packet of data associated with each stream is assigned a unique sequence number, which, in essence, is assigned by the client through acknowledge/request command. Server 260 maintains a table of packet assignments so that client 264 may request retransmission of any particular packet or group of packets in the event of a transmission error. Packets that have not been requested by the client are not yet assigned a sequence number. In FIGS. 9C and 9D, means 304 is transmitting packets 1 to END from stream Y (where END is the ending sequence number).

In FIG. 9D, means 306 of client 264 has detected that packet N+4 is missing and/or corrupted. Upon detecting the corrupted packet and before server 260 has completed transmitting the burst, means 308 transmits an acknowledge/request command to server 260 that acknowledges that packets 1 to N+3 have been received, and requesting that server 260 transmit packets N+4 to END in a burst. Means 310 receives the acknowledge/request command, halts transmission of the current burst, and resumes transmitting the remainder of the burst from the N+4 packet. At the end of the burst, if there is additional data required to complete the page, means 309 of client 264 directs control back to means 302. This process continues until all data in all stream associated with the page has been transmitted to client 264.

After all data associated with a page has been transmitted, means 312 of server 260 determines whether additional pages need to be sent to client 264. If there are additional pages, control is passed to means 298. If not, means 314 of server 260 issues a close connection request to client 264. Means 316 of client 264 receives the close connection request, thereby closing the virtual connection.

In addition to the connected commands described above, there is also a probe command. The probe command is contained in a directed, connected command packet sent by the system to the printer to inform the printer that the system is still functioning and the virtual connection is still open. In a preferred embodiment, a probe is sent about every 30 seconds. The printer responds to a probe command with a probe response command, which is also contained in a directed, connected command packet. If the printer fails to respond to a probe command with a probe response command within a specified period of time, then the virtual connection is terminated.

The protocol of the present invention facilitates printing a document over a network by increasing the speed of raster data transfers over the network. This is achieved by several unique features of the present invention. In one embodiment, a separate network is provided to transmit raster data. By providing a separate network, the total bandwidth of the network is available to transmit raster data.

In addition, the present invention provides a protocol which minimizes protocol overhead within a printer or computer system. A received packet is examined in the local memory of the network hardware, and is ignored if not needed, and only those bytes of the received packet that are required are transferred from local memory. Further, data is transferred directly from the local memory of the network hardware directly to the memory raster connection management module, as opposed to the multiple transfers that occur as data moves up and down a conventional ISO-OSI stack. Finally, the data may be compressed and decompressed to obtain additional network bandwidth. The present invention also defines a unique raster data transmission format that minimizes the handshaking required by prior art transmission protocols.

For any given network, the present invention has the potential to achieve up to 10 times the effective data transfer rate of raster data through the network compared to conventional techniques. Accordingly, the present invention facilitates host based RIPing of documents represented by PDL instructions and anticipates other advances in the art that are dependent on network throughput.

Although the present invention has been described with reference to preferred embodiments, workers skilled in the art will recognize that changes may be made in form and detail without departing from the spirit and scope of the invention.

What is claimed is:

1. A protocol for governing a transfer of a large block of data from a server to a client over a packet-based network arranged to connect at least three network-based devices, the protocol comprising:

the server and client negotiating a parameter of the transfer using a first sub-protocol comprising:
the server sending an open connection request to the client,
the client sending an open connection response to the server, and
the server sending a begin transmission command to the client; and the server transferring the large block of a data to the client using a second sub-protocol distinct from the first sub-protocol and based on the parameter, the second sub-protocol comprising:
the client sending an acknowledge/request command to the server, wherein the acknowledge/request command includes a starting sequence number and an ending sequence number,
the server dividing the large block of data into packets and assigning sequence numbers between the starting sequence number and the ending sequence number to packets, and sending a burst of packets to the client the burst including all packets between the starting and ending sequence numbers,
the client detecting missing packets and corrupted packets received from the server, and repeating sending an acknowledge/request command to the server to request retransmission of missing and corrupted packets, and
the client determining whether transmission of the large block of data has completed, and repeating sending an acknowledge/request command to the server to request more packets if transmission of the large block of data has not completed.

2. The protocol of claim 1 wherein the first sub-protocol includes the server sending at least one command packet to the client, and the client sending a response packet to the server for each command packet.

3. The protocol of claim 2 wherein missing command packets and missing response packets are detected by the server measuring a time interval beginning when a command packet is sent to the client.

4. The protocol of claim 1 wherein the number of packets sent to the client is based on the parameter.

5. The protocol of claim 4 wherein the client sends a request/acknowledge command to the server before the server finishes sending all packets to the client.

6. The protocol of claim 1 wherein the open connection request includes a network address of the server, and a maximum number of data packets that the server can transmit in a single burst, and the open connection response includes a maximum number of data packets that the client can receive in a single burst, wherein a difference between the starting sequence number and the ending sequence number of each acknowledge/request command does not exceed the maximum number of data packets that the server can transmit in a single burst nor the maximum number of data packets that the client can receive in a single burst.

7. The protocol of claim 1 wherein the first sub-protocol further comprises:
the server sending a job information request to the client, the job information request including a job type, a number of pages contained in the large block of data, and dimensions of each page contained in the large block of data; and
the client sending a job information response to the server accepting or rejecting the job information request.

8. The protocol of claim 1 wherein the large block of data is subdivided into stream types, with each stream type representing a color, acknowledge/request commands sent by the client include a stream type, and bursts of packets sent by the server are all of the stream type requested in the acknowledge/request command.

9. A protocol for governing a transfer of a page of raster data from a raster server to a raster client over a packet-based network equipped to connect at least three network-based devices, wherein the page of raster data is comprised of a sequence of packets, the protocol comprising:

the raster server sending an open connection request to the raster client;
the raster client sending an open connection response to the raster server;
the raster server sending a new page command to the raster client;
the raster client sending an acknowledge/request command to the raster server, wherein the acknowledge/request command includes a starting sequence number and an ending sequence number;
the raster server assigning sequence numbers between the starting sequence number and the ending sequence number to packets, and sending a burst of packets to the raster client, the burst including all packets between the starting and ending sequence numbers;
the raster client detecting missing packets and corrupted packets received from the raster server, and repeating sending an acknowledge/request command to the raster server to request retransmission of missing and corrupted packets; and
the raster client determining whether transmission of the page of raster data has completed, and repeating sending an acknowledge/request command to the raster server to request more packets if transmission of the page has not completed.

10. The protocol of claim 9 and further comprising:
the raster server multicasting a raster client request to all network-based devices, the raster client request including a network address of the raster server; and
all network-based devices capable of receiving raster data as a raster client sending a raster client response to the server, with the raster client response including a network address of the network-based device, a device type of the network-based device, and status information for the network-based device.

11. The protocol of claim 10 and further comprising:
the raster server updating a raster client table using information contained in the raster client responses received from the network-based devices capable of receiving raster data.

12. The protocol of claim 9 and further comprising:

the raster server selecting the raster client from a raster client table.

13. The protocol of claim 9 wherein the open connection request includes a network address of the raster server, and a maximum number of data packets that the raster server can transmit in a single burst, and the open connection response includes a maximum number of data packets that the client can receive in a single burst, wherein a difference between the starting sequence number and the ending sequence number of each acknowledge/request command does not exceed the maximum number of data packets that the raster server can transmit in a single burst nor the maximum number of data packets that the client can receive in a single burst.

14. The protocol of claim 9 and further comprising:

the raster server sending a job information request to the raster client, the job information request including a job type, a number of pages comprising a document, and dimensions of each page; and the raster client sending a job information response to the raster server accepting or rejecting the job information request.

15. The protocol of claim 14 wherein the job information response includes printer profile information.

16. The protocol of claim 9 wherein the page of raster data is subdivided into stream types, with each stream type representing a color, acknowledge/request commands sent by the raster client include a stream type, and bursts of packets sent by the raster server are all of the stream type requested in the acknowledge/request command.

17. The protocol of claim 9 and further comprising:

the raster server determining whether additional pages need to be transmitted to the raster client; and the server repeating sending a new page command to the raster client for each additional page.

18. The protocol of claim 9 and further comprising:

the raster server sending a close connection request to the raster client.

19. The protocol of claim 9 wherein the open connection request includes a unique server connection identification code and the open connection response includes a unique client connection identification code, wherein a unique connection identification code is established by the combination of the unique server correction identification code and the unique client connection identification code.

* * * * *